Patented May 15, 1951

2,553,265

UNITED STATES PATENT OFFICE 2,553,265

METHOD OF MAKING ZIRCON REFRACTORY

John M. Mochel, Corning, N. Y., assignor to Corning Glass Works, Corning, N. Y., a corporation of New York No Drawing. Application November 6, 1947, Serial No. 784,526

3 Claims. (Cl. 106—57)

This invention relates to refractory compositions and refractory bodies which are composed of zirconium silicate, or zircon as it is more commonly known, and which are suitable for use in contact with molten glass.

The solubility of zircon in molten glass is very slight, which should make it particularly suitable as a glass contacting refractory and many compositions containing it have been proposed. In zircon refractories most bonding agents prdouce a glassy matrix which is invariably more soluble in molten glass than the zircon itself. A zircon refractory which is free from glassy matrix is to be desired. However, a body consisting of zircon alone is difficult to shrink to its maximum density and as a result has an objectionable amount of porosity. It has therefore become customary to mix with the zircon small amounts of certain metallic oxides such as iron oxide or manganese oxide which act as shrinking agents or mineralizers. Such oxides have a strong fluxing action on any free silica which may be present and form easily soluble glasses therewith as a matrix in the zircon body. Free silica is always present in zircon which has been finely pulverized in a ball mill with flint balls, but grinding is essential if the material is to be slip cast.

For these reasons prior refractory zircon bodies have not been as corrosion resistant as could be desired. Moreover, when used in contact with molten lime glasses and glasses containing relatively large percentages of lime and magnesia of the type commonly employed in the production of "tempered" glassware of the compositions disclosed in United States Patent No. 2,231,811, prior refractory zircon bodies give rise to an objectionable number of seeds or small bubbles in the glass, whereby fining of the glass is difficult if not impossible.

The primary object of this invention is to provide a zircon refractory body of maximum density and minimum porosity, which contains no free silica nor glassy matrix and which has a better corrosion resistance and less seed forming tendency than prior zircon refractories.

Another object is to provide a method for producing such refractory bodies.

To these and other ends the invention includes a refractory zircon body and the method of making it, which comprises adding to the zircon finely divided zirconia, $ZrO_2$, in an amount which is at least the stoichiometric equivalent of the free silica calculated as zircon, not more than about 1% of $TiO_2$, and up to about 1% of an oxide of either manganese or iron, molding the mixture to shape and firing the shaped body at a temperature of at least 1500° C.

It has been found that the addition of zirconia to the zircon practically prevents fluxing of the free silica by the shrinking agents and by other fluxing oxides, such as CaO, which may be present in small amounts as impurities. The new refractory bodies are therefore characterized by the substantial absence of a glassy matrix.

It has further been found that the addition of $TiO_2$ in the amounts indicated above increases the shrinking effect of the shrinking agents and therefore causes a further increase in the density of the body and a corresponding decrease in its porosity or percentage of voids. Unexpectedly the presence of the $TiO_2$ also causes a definite decrease in the tendency of the refractory body to form seeds in the molten glass. Amounts of $TiO_2$ which exceed about 1% however cause cracking or disintegration of the refractory body.

Because the new refractory bodies have a higher density and less glassy matrix than prior refractory zircon bodies, they have a better corrosion resistance than the prior bodies and, as pointed out above, they also have less tendency to form seeds in the glass.

The following examples illustrate the invention, but its scope is not limited thereto:

Example 1

Finely pulverized zircon containing about 4% by weight of free or excess silica was mixed with zirconia and a small amount of titania and iron oxide in the following proportions in parts by weight: 90 zircon, $9ZrO_2$, $1TiO_2$, 1FeO. The mixture was formed into a slip and cast in the usual manner to form small rectangular bars which were fired for 24 hours at 1550° C. and then were tested as follows:

A bar of the refractory was placed in a crucible and covered with cullet of a high lime-magnesia glass. The crucible and its contents was heated slowly to 1450° C. and held at this temperature for 15 hours.

The amount of seeds evolved by the refractory was determined by counting with a microscope all of the seeds in a polished vertical section of the melt 3 mm. thick and 25 mm. wide taken from directly above the refractory bar and along its long axis. The number of seeds thus measured was 5 as compared with 20 which were counted in an identical test on a similar refractory bar composed of the zircon alone.

The penetration of the glass into the refractory bar was measured by examining it under a microscope with a micrometer eye-piece. The result was 0.4 mm. as compared with 2.3 mm. for the bar composed of zircon alone.

The percentage of voids as calculated from the apparent density of the test bar was 9% as compared to 22% for the bar composed of zircon.

Whereas the physical condition of the bar of Example 1 after the above treatment with molten glass was good and it was not cracked, the corresponding bar composed of zircon had its surface badly disintegrated or sloughed off.

*Example 2*

The composition was similar to that of Example 1 but contained MnO in lieu of FeO. The proportions in parts by weight were: 90 zircon, $9ZrO_2$, $1TiO_2$, $1MnO$. Small bars were slip cast, fired and tested in the manner described above for Example 1. The results were: Number of seeds 16, penetration of glass into refractory 0.9 mm., voids 15%, physical condition good.

I claim:

1. The method of making a dense, non-porous refractory body possessing increased resistance to corrosion by molten glass from finely pulverized zircon containing free $SiO_2$, which comprises preparing a mixture consisting essentially of such zircon, finely divided $ZrO_2$ in substantially the stoichiometric proportion to form $ZrSiO_4$ with the free $SiO_2$, about 1% of finely divided $TiO_2$, and the indicated proportion of a finely divided metal oxide selected from the group consisting of about 1% of an oxide of manganese computed as MnO and about 1% of an oxide of iron computed as FeO, forming a slip from such mixture, molding the slip to form a body of desired shape, and firing the shaped body at a temperature of at least 1500° C.

2. The method of making a dense, non-porous refractory body possessing increased resistance to corrosion by molten glass from finely pulverized zircon containing free $SiO_2$, which comprises preparing a mixture consisting essentially of such zircon, finely divided $ZrO_2$ in substantially the stoichiometric proportion to form $ZrSiO_4$ with the free $SiO_2$, about 1% of finely divided $TiO_2$, and about 1% of a finely divided oxide of iron computed as FeO, forming a slip from such mixture, molding the slip to form a body of desired shape, and firing the shaped body at a temperature of at least 1500° C.

3. The method of making a dense, non-porous refractory body possessing increased resistance to corrosion by molten glass from finely pulverized zircon containing free $SiO_2$, which comprises preparing a mixture consisting essentially of such zircon, finely divided $ZrO_2$ in substantially the stoichiometric proportion to form $ZrSiO_4$ with the free $SiO_2$, about 1% of finely divided $TiO_2$, and about 1% of a finely divided oxide of manganese computed as MnO, forming a slip from such mixture, molding the slip to form a body of desired shape, and firing the shaped body at a temperature of at least 1500° C.

JOHN M. MOCHEL.

REFERENCES CITED

The following references are of record in the file of this patent:

UNITED STATES PATENTS

| Number | Name | Date |
|---|---|---|
| 1,816,006 | Easter | July 28, 1931 |
| 2,267,772 | Wainer et al. | Dec. 30, 1941 |
| 2,338,209 | Smith | Jan. 4, 1944 |